United States Patent Office 3,223,685
Patented Dec. 14, 1965

3,223,685
2-VINYLOXYETHYL THIOCYANATE AND
POLYMERIZATION PRODUCTS THEREOF
John W. Lynn, Charleston, W. Va., assignor to Union
Carbide Corporation, a corporation of New York
No Drawing. Filed Dec. 27, 1960, Ser. No. 78,246
4 Claims. (Cl. 260—79.7)

This invention relates to 2-vinyloxyethyl thiocyanate as a new composition of matter, and to processes for its preparation by the reaction of a thiocyanate salt with a 2-haloethyl vinyl ether. This invention also relates to the polymerization of this novel compound.

According to the process of the instant invention, 2-vinyloxyethyl thiocyanate can be prepared by reacting a thiocyanate salt with a 2-haloethyl vinyl ether. Since the starting materials employed in the process of the instant invention are commercially available, the instant invention provides a convenient method of preparing 2-vinyloxyethyl thiocyanate. The preparation of this novel monomer can be illustrated by the following graphic equation:

$CH_2=CH-O-CH_2-CH_2-X + MSCN \rightarrow$
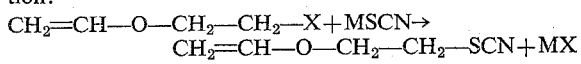
$CH_2=CH-O-CH_2-CH_2-SCN + MX$ wherein X is a halogen radical, including fluorine, chlorine, bromine and iodine radicals; and M is an alkali metal, including sodium, potassium and lithium, an alkaline earth metal, including calcium, strontium and barium, or an ammonium radical. Thus, for example, 2-vinyloxyethyl thiocyanate can be prepared by reacting sodium thiocyanate with 2-chloroethyl vinyl ether.

Since one mole of thiocyanate salt reacts with one mole of 2-haloethyl vinyl ether to produce one mole of 2-vinyloxyethyl thiocyanate, it is preferable to employ equimolar amounts of these reactants when effecting reaction according to the process of the instant invention; however, an excess of either reactant, up to about 3 times the stoichiometric equivalent, can also be employed whenever it is desirable to do so.

Reaction according to the process of the instant invention readily occurs at temperatures ranging from as low as 30° C. to as high as 150° C., but is preferably effected at temperatures ranging from about 50° C. to about 100° C.

Atmospheric pressure is usually employed in effecting reaction according to the process of the instant invention. However, pressures both above and below atmospheric pressure, for example pressures ranging from as low as 100 mm. Hg to as high as 1000 p.s.i.g., can also be employed whenever it is desirable to do so.

Reaction according to the process of the instant invention may be effected in an inert liquid solvent. By an "inert liquid solvent" is meant a liquid solvent in which the starting materials are soluble to an extent whereby they are brought into reactive contact and which itself is essentially nonreactive under the conditions of the reaction. Suitable inert liquid solvents which can be employed include hydrocarbons such as hexane, cyclohexane, heptane, benzene, toluene and the like, ethers such as isopropyl ether, ethyl ether, dioxane, tetrahydrofuran and the like, esters such as ethyl acetate, butyl acetate and the like, and ketones such as acetone and the like. In general, an amount of solvent ranging from 0 to 10 times, preferably from 1 to 5 times, the weight of reactants present can be effectively employed.

The novel 2-vinyloxyethyl thiocyanate of the instant invention has been found to have a high degree of biological activity and can be used as a fungicide and bactericide. Because of the vinyl group present therein, 2-vinyloxyethyl thiocyanate can be readily homopolymerized, or interpolymerized with one or more polymerizable organic compounds, such as styrene, butadiene, methyl acrylate, methyl methacrylate, vinyl acetate, vinyl chloride, vinylidene chloride, acrylonitrile, methacrylonitrile, vinylidene cyanide, acrylamide, methacrylamide, maleic anhydride, N-vinylacetamide, vinyl methyl ether and the like. The polymeric materials produced by polymerizing 2-vinyloxyethyl thiocyanate are useful in forming films, fibers and coatings.

Polymerization of 2-vinyloxyethyl thiocyanate can be effected by means of heat, light, or a suitable vinyl polymerization catalyst. Preferably, polymerization is effected by heating in the presence of a polymerization catalyst in order to shorten the reaction time. Temperatures ranging from as low as 30° C. to as high as 100° C. are generally effective for this purpose. Lewis type acids, such as boron trifluoride, aluminum trichloride and stannic chloride, are suitable catalysts for effecting homopolymerization of 2-vinyloxyethyl thiocyanate, while peroxides and azo compounds are suitable catalysts for effecting copolymerization of 2-vinyloxyethyl thiocyanate and other polymerizable organic compounds. Among the peroxides which can be employed as catalysts may be mentioned hydrogen peroxide, barium peroxide, magnesium peroxide, diethyl peroxide, distearyl peroxide, acetyl peroxide, stearoyl peroxide and acetyl benzoyl peroxide. Illustrative examples of the azo compounds which can be employed as catalysts include $\alpha,\alpha'$-azo-bis-isobutyronitrile, 2,2-dicyano-bis-azobenzene, and the like.

The interpolymers obtained by interpolymerizing 2-vinyloxyethyl thiocyanate can contain from as low as 0.5 molar percent to as high as 95 molar percent of combined 2-vinyloxyethyl thiocyanate.

The following examples are set forth for purposes of illustration so that those skilled in the art may better understand this invention, and it should be understood that they are not to be construed as limiting this invention in any manner.

EXAMPLE I

Preparation of 2-vinyloxyethyl thiocyanate

An admixture of 213 grams (2 moles) of 2-vinyloxyethyl chloride, 178 grams (2.2 moles) of sodium thiocyanate and 800 ml. of anhydrous acetone was prepared and heated at its refluxing temperature for six hours. At the end of this time, the reaction mixture was cooled and filtered. The filtrate was distilled and 12 grams of 2-vinyloxyethyl thiocyanate, boiling at a temperature of 72° C. at 2.5 mm. Hg pressure, were collected. This represented a yield of about 5 percent of theoretical. The 2-vinyloxyethyl thiocyanate product had an index of refraction of 1.4879 at 30° C. and was identified by its infrared absorption spectrum and chemical analysis. *Analysis.*—Calculated for $C_5H_7NOS$: C, 46.5%; H, 5.97%; N, 10.85%. Found: C, 46.99%; H, 5.97%; N, 10.36%.

EXAMPLE II

Copolymerization of 2-vinyloxyethyl thiocyanate with vinylidene chloride

To a Pyrex polymerization tube were charged 3 grams of 2-vinyloxyethyl thiocyanate, 7 grams of vinylidene chloride, and 0.1 gram of azo-bis-isobutyronitrile. After purging the tube with nitrogen, the tube was sealed and rocked in a water bath maintained at a temperature of 50° C. for three hours. Upon cooling, the tube was opened and acetone was added to the contents thereof. The resulting mixture was filtered, and the precipitate collected was washed with acetone and dried by heating. About 1.5 grams of copolymer were recovered in this manner. This represented a yield of about 15 percent of the theoretical yield of copolymer. The copolymer was composed of about 89.2 percent by weight of combined vinylidene chloride and 10.8 percent by weight of combined 2-vinyloxyethyl thiocyanate, and had a reduced viscosity of 0.18 in cyclohexanone at 30° C. using a solution of 0.2 gram of polymer per 100 milliliters of solution.

Reduced viscosity ($I_R$) is a measure of the molecular weight of a polymer, and can be defined by the equation $$IR = \frac{\frac{\Delta N}{N_0}}{C}$$

wherein $\Delta N$ is the difference in seconds between the flow-time of a solution of polymer through a capillary viscometer and the flow-time of the solvent, $N_0$ represents the flow-time of the solvent, and C is the concentration of polymer in said solution in grams per 100 ml. of solution.

EXAMPLE III

*Use of 2-vinyloxyethyl thiocyanate as a fungicide*

To 1000 ml. of distilled water were added 39 grams of "Difco" potato dextrose agar and 5 grams of "Difco Bacto" agar. The resulting mixture was heated in a steam oven until the agar was completely dissolved in the water. Eighteen (18) ml. aliquots of the solution were then added to each of two 50-ml. Erlenmeyer flasks. The flasks were plugged with cotton, autoclaved with steam at a pressure of 15 p.s.i. for 20 minutes, and then cooled in a constant temperature bath maintained at a temperature of 56–60° C.

To one of the flasks were added 2 ml. of a test emulsion having a concentration of 1000 p.p.m. of 2-vinyloxyethyl thiocyanate. The test emulsion was prepared by dissolving 1000 mg. of 2-vinyloxyethyl thiocyanate in 50 ml. of an acetone-emulsifier solution [prepared by admixing 1000 ml. of acetone and 5 ml. of "Triton X–155" (an alkyl aryl polyether alcohol)] and diluting the resulting solution with water. A similar emulsion free from 2-vinyloxyethyl thiocyanate was added to the second flask which was employed as a control. The flasks were then agitated to insure uniform mixing, and the contents thereof were immediately poured into two sterilized Petri dishes. Upon cooling, the contents of the two dishes solidified.

The solid agar prepared in accordance with the above-procedure was then inoculated with various test organisms. The organisms employed were *Fusarium gladiola, Aspergillis oryzae, Penicillum piscarium* and *Pullularia* sp. These organisms had been cultured on potato dextrose agar (pH 4.5–5.5) at a temperature of 20° C. for 1 to 2 weeks. Inoculation was accomplished by adding 10 ml. of a sterilized 1 percent aqueous solution of "Tween 20" (a polyoxyalkylene derivative of sorbitan monolaurate) to each colony of test organism in a test tube, gently rubbing the surface of the cultured colony with a transfer loop, agitating the test tube thoroughly to produce a suspension, and then transferring a loopful of the suspension by means of a sterilized transfer loop to each of the agar-filled Petri dishes. The test organism suspensions were applied in the form of streaks stemming from the center of the Petri dishes towards the edge.

The Petri dishes were then incubated at a constant temperature of 20° C. for 5 days. At the end of this time, the dishes were examined and it was found that there had been no visible growth of the various fungi colonies in the dish that had been treated with the emulsion containing 2-vinyloxyethyl thiocyanate, while there had been a heavy growth of the various fungi colonies in the dish.

EXAMPLE IV

*Use of 2-vinyloxyethyl thiocyanate as a bactericide*

To 1000 ml. of distilled water were added 8 grams of "Difco Bacto" nutrient broth and 15 grams of "Difco Bacto" agar. The resulting mixture was heated in a steam oven until the nutrient broth and agar were completely dissolved in the water. Eighteen (18) ml. aliquots of the solution were then added to each of two 50-ml. Erlenmeyer flasks. The flasks were plugged with cotton, autoclaved with steam at a pressure of 15 p.s.i. for 20 minutes, and then cooled in a constant temperature bath maintained at a temperature of 50–60° C.

To one of the flasks were added 2 ml. of a test emulsion having a concentration of 1000 p.p.m. of 2-vinyloxyethyl thiocyanate. The test emulsion was prepared by dissolving 1000 mg. of 2-vinyloxyethyl thiocyanate in 50 ml. of an acetone-emulsifier solution [prepared by admixing 1000 ml. of acetone and 5 ml. of "Triton X–155" (an alkyl aryl polyether alcohol)] and diluting the resulting solution with water. A similar emulsion free from 2-vinyloxyethyl thiocyanate was added to the second flask which was employed as a control. The flasks were then agitated to insure uniform mixing, and the contents thereof were immediately poured into two sterilized Petri dishes. Upon cooling, the contents of the two dishes solidified.

The solid agar prepared in accordance with the above-procedure was then inoculated with various test organisms. The organisms employed were *Escherichia coli, Micrococcus pyrogenes* var. *aureus* and *Erwinia amylovora*. These oragnisms had been cultured on nutrient agar (pH 7.0) at a temperature of 20° C. for 1 week. Inoculation was accomplished by transfering a loopful of each bacterial colony by means of a sterilized transfer loop to each of the agar-filled Petri dishes. The test organisms were applied in the form of streaks stemming from the center of the Petri dish towards the edge.

The Petri dishes were then incubated at a constant temperature of 20° C. for 6 days. At the end of this time, the dishes were examined and it was found that there had been no visible growth of the *Erwinia amylovora* colony, and only slight growth of the *Escherichia coli* and *Micrococcus pyrogenes* colonies, in the dish that had been treated with the emulsion containing 2-vinyloxyethyl thiocyanate, while there had been a heavy growth of the various bacterial colonies in the control dish.

What is claimed is:
1. 2-vinyloxyethyl thiocyanate.
2. A copolymer of 2-vinyloxyethyl thiocyanate and vinylidene chloride.
3. A process for producing a copolymer of 2-vinyloxyethyl thiocyanate and vinylidene chloride which comprises heating a mixture of 2-vinyloxyethyl thiocyanate, vinylidene chloride and a vinyl polymerization catalyst.
4. A process for producing an interpolymer of 2-vinyloxyethyl thiocyanate and at least one other polymerizable organic compound, which comprises heating said 2-vinyloxyethyl thiocyanate with at least one other polymerizable organic compound in the presence of a vinyl polymerization catalyst.

References Cited by the Examiner
UNITED STATES PATENTS

| | | | |
|---|---|---|---|
| 2,139,335 | 12/1938 | Shoemaker | 260—454 |
| 2,281,692 | 5/1942 | Hester et al. | 260—454 |
| 2,757,190 | 7/1956 | Jones et al. | 260—454 |
| 2,877,214 | 3/1959 | Opheim et al. | 260—79.7 |
| 2,906,741 | 9/1959 | Hwa | 260—79.7 |
| 3,127,408 | 3/1964 | Hopkins | 260—454 |

OTHER REFERENCES

E. Wertheim: "Textbook of Organic Chemistry," Blakiston Pub. Co., Philadelphia (1945), pp. 292 and 293.

LEON J. BERCOVITZ, *Primary Examiner.*

H. N. BURSTEIN, J. R. LIBERMAN, DONALD E. CZAJA, *Examiners.*